United States Patent
Pettersson et al.

(10) Patent No.: US 10,788,211 B2
(45) Date of Patent: Sep. 29, 2020

(54) COMBUSTION CHAMBER FOR A GAS TURBINE ENGINE

(71) Applicant: Siemens Aktiengesellschaft, Munich (DE)

(72) Inventors: Jan Pettersson, Lotorp (SE); Ulf Raadeklint, Norrköping (SE)

(73) Assignee: Siemens Aktiengesellschaft, Munich (DE)

( * ) Notice: Subject to any disclaimer, the term of this patent is extended or adjusted under 35 U.S.C. 154(b) by 218 days.

(21) Appl. No.: 15/544,067

(22) PCT Filed: Oct. 14, 2015

(86) PCT No.: PCT/EP2015/073755
§ 371 (c)(1),
(2) Date: Jul. 17, 2017

(87) PCT Pub. No.: WO2016/116176
PCT Pub. Date: Jul. 28, 2016

(65) Prior Publication Data
US 2018/0010798 A1   Jan. 11, 2018

(30) Foreign Application Priority Data
Jan. 23, 2015   (EP) .................................... 15152337

(51) Int. Cl.
*F23R 3/00*   (2006.01)
*F02K 1/82*   (2006.01)

(52) U.S. Cl.
CPC .............. *F23R 3/002* (2013.01); *F02K 1/827* (2013.01); *F05D 2260/96* (2013.01); *F23R 2900/00014* (2013.01)

(58) Field of Classification Search
None
See application file for complete search history.

(56) References Cited

U.S. PATENT DOCUMENTS 2,958,194 A * 11/1960 Bayler ...................... F23R 3/06
60/760
4,944,362 A * 7/1990 Motsinger ............... F02K 1/827
181/213
(Continued)

FOREIGN PATENT DOCUMENTS

CN       1551965 A    12/2004
CN     103765107 A     4/2014
(Continued)

OTHER PUBLICATIONS

EP Search Report dated Jul. 6, 2015, for EP patent application No. 15152337.0.
(Continued)

*Primary Examiner* — Steven M Sutherland
*Assistant Examiner* — Rodolphe Andre Chabreyrie
(74) *Attorney, Agent, or Firm* — Wolter Vandyke Davis, PLLC

(57) ABSTRACT

A combustion chamber for a gas turbine engine includes: an inner wall delimiting an inner volume of the combustion chamber, through which combustion gas flow from a burner to a gas turbine of the gas turbine engine, a plurality of dampening cavities for the dampening of thermo-acoustic vibrations in the combustion gas, each dampening cavity communicating with the inner volume through at least a dampening hole on the inner wall, at least a cooling passage for a cooling medium flowing outside the inner volume in thermal contact with the inner wall, each dampening cavity having at least a purging hole communicating with the cooling passage for purging a portion of the cooling medium through the dampening cavities to the inner volume.

15 Claims, 4 Drawing Sheets

(56) References Cited

U.S. PATENT DOCUMENTS

| | | | | |
|---|---|---|---|---|
| 5,363,654 A * | 11/1994 | Lee | ............ | F23R 3/002 165/908 |
| 5,655,361 A * | 8/1997 | Kishi | ............ | F02K 1/827 181/222 |
| 8,931,280 B2 * | 1/2015 | Kaleeswaran | ............ | F23R 3/002 60/752 |
| 2004/0237504 A1 | 12/2004 | Pinard et al. | | |
| 2004/0248053 A1 | 12/2004 | Benz et al. | | |
| 2006/0059913 A1 | 3/2006 | Bethke et al. | | |
| 2006/0207259 A1 * | 9/2006 | Holt | ............ | F23M 5/085 60/772 |
| 2007/0283700 A1 * | 12/2007 | Gerendas | ............ | F23R 3/002 60/754 |
| 2009/0094985 A1 * | 4/2009 | Johnson | ............ | F23R 3/002 60/752 |
| 2011/0138812 A1 * | 6/2011 | Johnson | ............ | F23R 3/00 60/725 |
| 2011/0220433 A1 * | 9/2011 | Nakamura | ............ | F01D 9/023 181/213 |
| 2013/0031904 A1 * | 2/2013 | Garry | ............ | F23R 3/002 60/722 |
| 2013/0074501 A1 * | 3/2013 | Tiwary | ............ | F23M 5/00 60/725 |
| 2013/0283809 A1 | 10/2013 | Twardochleb et al. | | |
| 2014/0150435 A1 * | 6/2014 | Maurer | ............ | F23R 3/42 60/752 |
| 2014/0345282 A1 | 11/2014 | Pfadler | | |
| 2014/0360196 A1 * | 12/2014 | Graves | ............ | F23R 3/002 60/753 |
| 2015/0020498 A1 | 1/2015 | Schilp | | |

FOREIGN PATENT DOCUMENTS

| | | |
|---|---|---|
| CN | 104285054 A | 1/2015 |
| CN | 103851645 B | 1/2016 |
| RU | 2219439 C1 | 12/2003 |
| RU | 2340784 C2 | 12/2008 |

OTHER PUBLICATIONS

International Search Report dated Feb. 2, 2016, for PCT/EP2015/073755.

RU search report dated Aug. 14, 2018, for corresponding RU patent application No. 2017129611/06.

* cited by examiner

COMBUSTION CHAMBER FOR A GAS TURBINE ENGINE

CROSS REFERENCE TO RELATED APPLICATIONS

This application is the US National Stage of International application No. PCT/EP2015/073755 filed Oct. 14, 2015, and claims the benefit thereof. The International application claims the benefit of European Application No. EP15152337 filed Jan. 23, 2015. All of the applications are incorporated by reference herein in their entirety.

FIELD OF INVENTION

The present invention relates to a combustion chamber for a gas turbine and to a gas turbine engine including such combustion chamber.

ART BACKGROUND

Thermo-acoustics of combustion dynamics is a well-known complex phenomenon which occurs rather frequently in modern low emission gas turbine combustors. The inherent instability of the combustion process is giving rise to dynamic thermo-acoustic vibrations in the combustion gas which may be caused by an unwanted interaction between the heat release and the surrounding acoustics. Due to the power involved in the combustion process high dynamic levels may be fatal, and in a coupled acoustic-structure interaction this might damage the surrounding combustion chamber structure. Severe combustion dynamics may also effect the overall operation of the gas turbine, manifested as high emission levels and costly problems during commissioning. This phenomenon needs to be suppressed and this may be achieved in different ways such as minimizing the acoustic interaction with the source, change the acoustic frequency spectrum, move the structure Eigen modes or introduce passive dampening devices to obtain allowable dynamic levels.

Suppressing of (low frequency) combustion instabilities in the combustion chamber are often addressed by the use of classic Helmholtz resonators. The dampening capability of this acoustic device is achieved by establishing an acoustic cavity behind a hole in the combustion chamber wall.

The target frequency, i.e. the frequency f to be suppressed by the device is determined by geometrical parameters of the cavity, namely: —the volume Vc of the cavity, —the cross sectional area A of the dampening hole between the cavity and the combustion chamber, —the length L of the dampening hole between the cavity and the combustion chamber.

According to the well-known theory of Helmholtz resonators the parameters above are linked to the frequency f to be suppressed is proportional to squared root of the ratio between area A and the product of volume Vc by the length L, i.e. in symbols:

$$f \sim \mathrm{sqrt}(A/(Vc*L))$$

The length L is linked to the thickness of the walls separating the Helmholtz resonator and the combustion chamber (typically ranging from 2 to 4 mm) and the area A of the dampening holes cannot be higher than an upper limit, depending on technological constraints, in particular structural requirements for the walls separating the Helmholtz resonator and the combustion chamber. Typical values for the diameter of the dampening holes range between 0.5 and 4 mm. Therefore, the above relationship shows that the only practical possibility for addressing mid- and high frequencies f is by means of small Helmholtz devices, i.e. Helmholtz devices characterized by small values of the volume Vc. However, this is hardly possible to implement due to the limitations of present manufacturing techniques. As an alternative, the so-called perforated liners or soft walls are used.

With reference to FIGS. 1 and 2, soft walls are realized by a large number of narrow-spaced holes 40a in a combustor inner wall 22a spaced from the outer wall 25a of a combustion chamber 1. The narrow-spaced holes 40a share the same acoustic cavity 30a comprised between the inner wall 22a and the outer wall 25a. Such a device, which is normally manufactured by welding, permits to suppress or limit a frequency interval whose values depends from dimension, spacing, cavity depth and length of the holes and from the velocity of the air flow through the holes.

A first drawback is linked to the necessity to provide a flow of a cooling medium, particularly compressed air, along the cavity 30a. Since the combustor walls are exposed to hot gas, they need to be cooled and to this scope a significant flow of cooling air at low velocity typically flows in the cavity 30a. However, due to the fact of having several hundreds of holes connected on the cold side, i.e. to the cavity 30a where cooling air flows, the risk of getting hot gas ingestion in the cavity 30a is present. The risk is due to different tangential and/or axial pressure variations across the inner combustion chamber wall 22a. In order to suppress this issue excessive amount of cooling air might be needed.

In addition, the dampening capability may in some cases mainly be based on a high air flow velocity through the dampening holes, an approach which consumes a lot of cooling air and thereby strongly restricts the number of holes to be used. As the number of holes is directly proportional to the degree of acoustic attenuation, this approach may results in insufficient dampening of the combustion instability.

Further for the solutions like to one above described, it is difficult to validate the numerical predictions deriving from general thermo-acoustic theories of soft walls, in the context of a gas turbine combustion chamber, i.e. a soft wall operating in a hot/cold environment at a high discharge pressure.

In any case the design choice is nowadays limited by the manufacturing methods currently used for the dampening segments, for the fact that it is not feasible or economically viable to have up to one thousand holes with single cavities in a wall segment.

Different solution, involving the manufacturing of a limited number of dampening elements on the inner wall of the combustion chamber are shown in US 2015/020498, US 2006/059913 and US 2009/094985, which however do not show an optimal compromise between damping and cooling requirements.

The inconveniences described above show how the above described device, which has been considered an acceptable compromise between acoustic dampening requirements, cooling requirements and the existing manufacturing techniques, is therefore not optimal.

It is desirable to provide a new design for the walls of a combustion chamber for gas turbines, which efficiently provide the required degree of acoustic dampening and wall cooling.

SUMMARY OF THE INVENTION

It may be an object of the present invention to provide a combustion chamber for gas turbines permitting to suppress a wide range of frequencies, including mid- and high frequencies.

It may be a further object of the present invention to provide a combustion chamber for gas turbines having a wall which integrates dampening devices for the dampening of thermo-acoustic vibrations in the combustion gas inside the combustion chamber and a cooling system consuming a minimum amount of a cooling medium.

In order to achieve the objects defined above, a combustion chamber for a gas turbine and a gas turbine including such a combustion chamber are provided in accordance to the independent claims. The dependent claims describe advantageous developments and modifications of the invention.

According to a first aspect of the present invention, a combustion chamber for a gas turbine engine comprises: —an inner wall delimiting an inner volume of the combustion chamber, through which combustion gas flow from a burner to a gas turbine of the gas turbine engine, —a plurality of dampening cavities for the dampening of thermo-acoustic vibrations in the combustion gas, each dampening cavity communicating with the inner volume through at least a dampening hole on the inner wall, —at least a cooling passage for a cooling medium flowing outside the inner volume in thermal contact with the inner wall, each dampening cavity comprising at least a purging hole communicating with the cooling passage for purging a portion of the cooling medium through the dampening cavities to the inner volume.

According to the present invention, the establishment of an optimal complex acoustic geometry allows the separation of each dampening cavity, making it possible to utilize less cooling air since each cavity has only a reduced number of holes, i.e. only the holes necessary for suppress the undesired frequencies. In particular, it may be possible to manufacture cavities having only one respective single hole. This, for example, may be possible by using additive manufacturing techniques, which also may permit different damping concepts to be significantly easier or faster to test and verify.

Advantageously, this solution requires only a small purging flow in each cavity. The convective cooling of the wall is maintained in a separate channel in between the dampening cavities. From the convective cooling flow, only a small amount of air is bled off through the purging holes.

According to an exemplary embodiment of the present invention, each dampening cavity is delimited by the inner wall and by at least a cavity wall, the purging hole being provided on the cavity wall.

Advantageously, the purging hole is not provided on the inner wall, thus determining the dumping cavities to be interposed between the passage for the cooling medium and the inner volume of the combustion chamber. This permits to separate the main flow of the cooling medium from a secondary flow of the cooling medium, flowing in the dampening cavities for purging purposes.

According to another exemplary embodiment of the present invention, the combustion chamber further comprises an outer wall and an interspace, particularly an annular interspace, between the inner wall and the outer wall, the plurality of dampening cavities and the cooling passage being provided in said interspace. Advantageously, the plurality of dampening cavities and the cooling passage are placed in the interspace between the inner and outer walls of the combustion chamber, isolated from the combustion gas flowing along the combustion chamber.

According to another exemplary embodiment of the present invention, the plurality of dampening cavities extends from one to the other of said inner wall and outer wall. This allows the dampening cavities to be matched thermally also with the outer wall of the combustion chamber, in order to improve their mechanical integrity.

According to other possible exemplary embodiments of the present invention, the dampening cavities are arranged along one or more rows. In particular, according to one of this possible embodiments, the plurality of dampening cavities are arranged along a plurality of rows extending along a longitudinal direction parallel to the main flowing direction of the combustion gas inside the inner volume. In such or other embodiments, at least one cooling passage may be provided between a couple of the rows of dampening cavities. This permits to isolate in a simple and effective way the dampening cavities from the cooling passages, with the cooling medium flowing in a direction parallel to the main flowing direction of the combustion gas inside the combustion chamber. In particular, according to other possible exemplary embodiments of the present invention, the purging holes may be arranged at a negative angle with respect to the cooling medium flowing in the cooling passage. In such a way a dust trap can be arranged, making more difficult for dust or other solid particles to migrate from the cooling passage towards the dampening cavities and the combustion chamber.

According to another possible exemplary embodiment of the present invention, the section of the cooling passage has a section narrowing along the direction of the flow of cooling medium inside the cooling passage. Other shapes of the cooling passage may be possible according to the present invention. In this way it is possible to control the overall cooling effect along the cooling passage. Taylor-made solutions for concentrating the cooling effect on known hot areas of the combustor chamber may be possible.

According to another possible exemplary embodiment of the present invention, one or more of the dampening cavities comprise two side cavity walls in thermal contact with the cooling medium. In such a way, for example, a third side cavity wall may be in contact with another wall of the combustion chamber, particularly the outer wall. In this way dampening cavities can be matched thermally with the outer wall of the combustion chamber, to improve mechanical strength.

According to yet another possible exemplary embodiment of the present invention, one or more of the dampening cavities comprise three side cavity walls in thermal contact with the cooling medium. In this way dampening cavities can be in thermal contact with the cooling passage along all cavity walls, which are not coincident with the inner wall of the combustion chamber. This solution may provide a better cooling for embodiments where bigger dampening cavities, with more than one cavity hole, are used.

According to a second aspect of the present invention, a gas turbine engine comprises a burner, a gas turbine and a combustion chamber as above described, between the burner and the gas turbine.

The gas turbine in accordance with the present invention allows reaching the same advantages described above with reference to the rotor blade.

BRIEF DESCRIPTION OF THE DRAWINGS

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION

Figure 1:
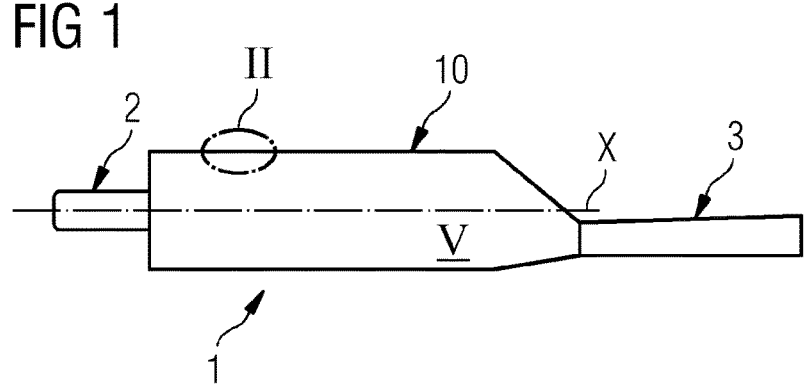
FIG. 1 is a partial schematic view of a gas turbine engine including a combustion chamber, sectioned along a longitudinal direction.

Hereinafter, above-mentioned and other features of the present invention are described in details. Various embodiments are described with reference to the drawings, wherein the same reference numerals are used to refer to the same elements throughout. The illustrated embodiments are intended to explain, and not to limit the invention.

FIG. 1 shows an example of a gas turbine engine 1 in a partial schematic sectional view.

Figure 2:
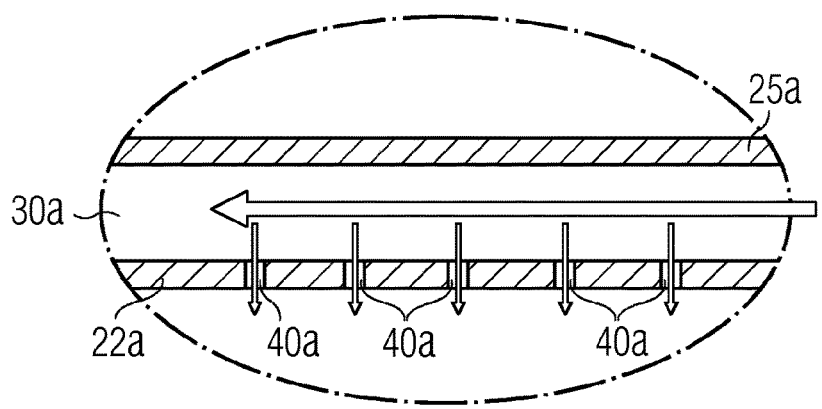
FIG. 2 shows a schematic magnified view of the detail II of FIG. 1, as known in the prior art.

More in general, the schematic layout of FIG. 1 can be used also for describing a gas turbine engine according to the known prior art. In particular, the detail II in FIG. 1 can be represented by both the magnifications in FIGS. 2 and 3, respectively showing a known solution already described above and a solution according to the present invention, better detailed in the following.

The gas turbine engine 1 (not shown as a whole) comprises, in flow series, a compressor section (not shown), a burner 2 a combustor chamber 10 and a gas turbine 3, which are generally arranged in flow series. In operation of the gas turbine engine 1, air is compressed by the compressor section and delivered to the combustion section, including the burner 2 and the combustion chamber 10. The compressed air exiting from the compressor enters the burner 2 where is mixed with a gaseous or liquid fuel. The air/fuel mixture is then burned and the combustion gas from the combustion is channelled through the combustion chamber 10 to the gas turbine section 1, for transforming the energy from the operative gas into working power. The combustion gas flows along the combustion chamber 10 along a main longitudinal direction X oriented from the burner 2 to the gas turbine 3.

The combustion section, burner 2 and the gas turbine 3 are not a specific object of the present invention and, therefore, in the following, only the combustion chamber 10 will be described in further detail.

Figure 3:
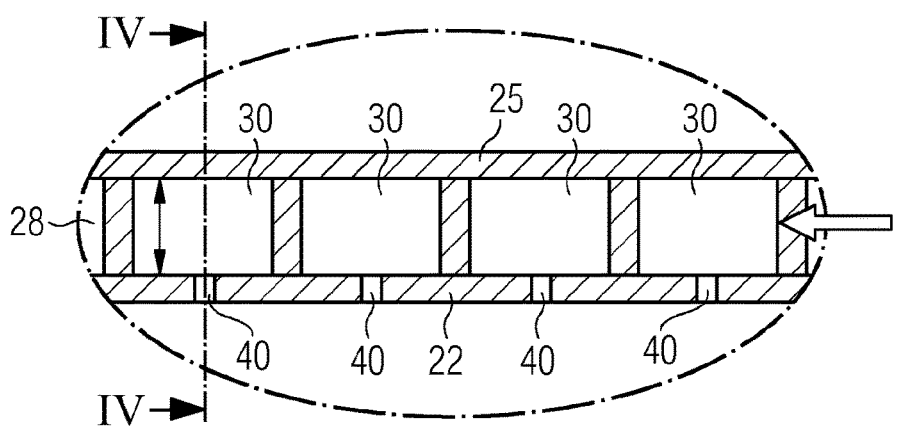
FIG. 3 shows a schematic magnified view of the detail II of FIG. 1, according to an embodiment of the present invention.
Figure 4:
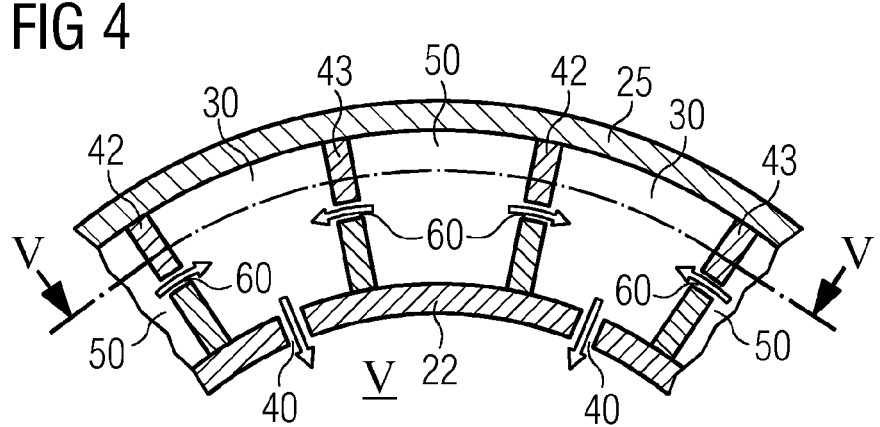
FIG. 4 shows a schematic cross-sectional view of the detail of a combustion chamber of FIG. 3, sectioned according to the line III-III of FIG. 3.
Figure 5:
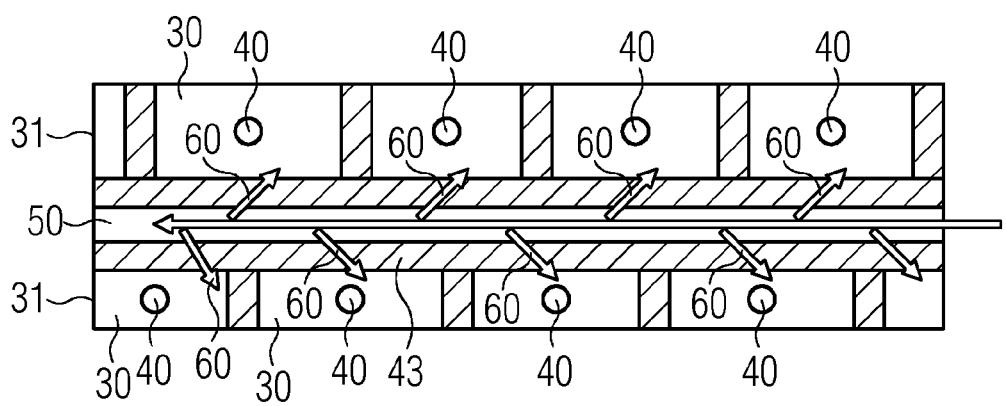
FIG. 5 shows a schematic sectional view of the detail of a combustion chamber of FIGS. 3 and 4, sectioned according to the circumferential surface IV-IV of FIG. 4.

With reference to FIGS. 3, 4 and 5, a combustion chamber 10 according to the present invention comprises an inner wall 22 delimiting an inner volume V of the combustion chamber 10, through which a combustion gas flow from a burner 2 to a gas turbine 3 of the gas turbine engine 1, along the main longitudinal direction X. The combustion chamber 10 further comprises an outer wall 25 and an annular interspace 28 between the inner wall 22 and the outer wall 25. The interspace 28 annularly extends around the inner volume V of the combustion chamber 10.

In the interspace 28 a plurality of dampening cavities 30 for the dampening of thermo-acoustic vibrations in the combustion gas, each dampening cavity 30 communicating with the inner volume V through at least a dampening hole 40 on the inner wall 22. Each dampening cavity 30 represents a Helmoltz resonator having the following main geometrical parameters: —the volume Vc of the dampening cavity 30, —the cross sectional area A of the dampening hole 40, —the length L of the dampening hole 40.

Each dampening cavity 30 can be used to suppress a frequency f of the thermo-acoustic vibrations in the combustion gas inside the volume V, the frequency f being proportional to squared root of the ratio between area A and the product of volume Vc by the length L, i.e. in symbols:

$$f \sim \mathrm{sqrt}(A/(Vc*L)).$$

Each dampening cavity 30 is delimited by the inner wall 22 and the outer wall 25 of the combustion chamber 10 and by at least two side cavity walls 42, 43, extending from one to the other of the inner wall 22 and the outer wall 25, orthogonally to the longitudinal direction X.

The two side cavity walls 42, 43 extends along the longitudinal direction X from the burner 2 to the gas turbine 3, in such a way that at least a portion of the dampening cavities 30 are arranged along at least one row 31, extending parallel to the longitudinal direction X. Two rows 31 are shown in the partial view of FIG. 5, but any number of rows 31 may be provided in the interspace 28 according to the present invention. In particular, according to a possible embodiment, a plurality of rows 31 may be distributed in the interspace 28 around the longitudinal direction X, regularly spaced from one another.

The interspace 28 further comprises at least a cooling passage 50, also extending from one to the other of said inner wall 22 and outer wall 25. In the embodiment of FIGS. 3, 4 and 5 a plurality of cooling passage 50 are provided.

Each cooling passage 50 is interposed between each couple of adjacent rows 31 of dampening cavities 30. Inside the cooling passage 50 a cooling medium flows outside the inner volume V, but in thermal contact with the inner wall 22. The cooling medium is typically a portion of the compressed air from the compressor section which bypasses the burner 2 and is channelled directly into the interspace 28. According to other possible embodiment of the present invention other cooling media may be used.

Each dampening cavity 30 comprises at least a purging hole 60 communicating with the cooling passage 50 for purging a portion of the cooling medium through the dampening cavities 30 to the inner volume V. The purging hole 60 is provided on one or both of the cavity walls 42, 43.

The purging holes 60 are normally of smaller dimensions with respect to the dampening holes 40, with a lower limit depending from the necessity of not getting blocked by solid particles, for example.

The purging holes 60 are arranged at a negative angle with respect to the cooling medium flowing in the cooling passage 50, in such a way that a dust trap can be arranged, making more difficult for dust or other solid particles to migrate from the cooling passage towards the dampening cavities 30 and the combustion chamber volume V.

According to other possible embodiments of the present invention, a great variety of geometrical arrangement of dampening cavities 30 and cooling passages 50 are possible.

For example, dampening cavities 30 may be not arranged in rows, but quincuncially or staggered or according to any other pattern.

Figure 6:
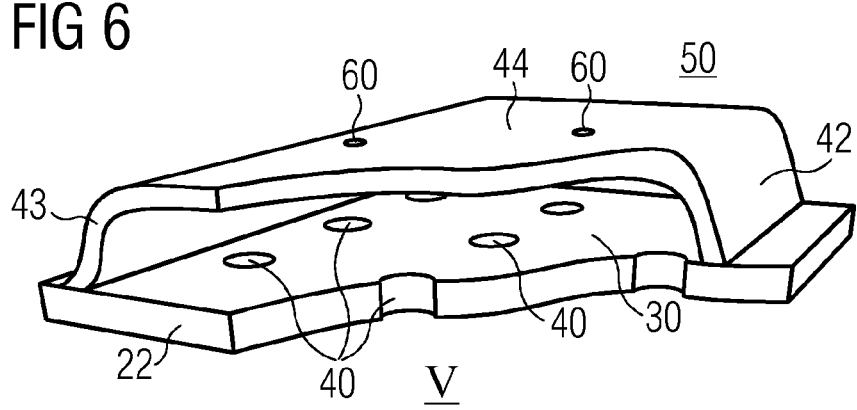
FIG. 6 is an axonometric partial view of another embodiment of a combustion chamber, according to the present invention, FIGS. 7, 8 and 9 respectively show three schematic plane projections of portions of a combustion chamber, according to three respective embodiments of the present invention.

In particular, according to the embodiment in FIG. 6, the dampening cavities 30 may not extend from one to the other of the inner wall 22 and the outer wall 25, but comprise a third side cavity walls 44 in thermal contact with the cooling medium and spaced from the outer wall 25. In such embodiment, the third side cavity walls 44 extends parallel to the longitudinal direction X and comprises a plurality of purging holes 60 and more than one dampening hole 40 is present for a single dampening cavity. The cooling passage 50 is in contact with the three side cavity walls 42, 43, 44.

Other embodiments (not shown) may derive from combinations of the embodiment in FIGS. 3, 4 and 5 with the embodiment in FIG. 6, for example, according to the invention, it may be possible to have one of more dampening cavities 30 with one single dampening hole 40 and with the purging holes 60 on the two side cavity walls 42, 43 (like the embodiment in FIGS. 3, 4 and 5) but with a cooling passage 50 in contact with the three side cavity walls 42, 43, 44 (like the embodiment in FIG. 6).

Also the cooling passage 50 may vary from the straight geometry represented in FIGS. 4 and 5. For example, according to a possible embodiment (not shown), the cooling passage 50 has a section narrowing along the direction of the flow of cooling medium inside the cooling passage 50. Other geometries of the cooling passage may be possible, in order to control the overall cooling effect along the cooling passage.

In the cooling passage 50 the cooling medium flows mainly longitudinally, i.e. parallel to the longitudinal direction X, from a first longitudinal end to a second longitudinal end of the cooling passage 50.

According to one possible embodiment of the present invention, the cooling passage(s) 50 and the dampening cavities 30 are provided on the combustion chamber 10, for all its longitudinal extension along direction X and all its circumferential extension around direction X.

According to another possible embodiment of the present invention, only a reduced section of the combustion chamber 10, limited in its longitudinal extension along direction X or in its circumferential extension around direction X, comprises the cooling passages 50 and the dampening cavities 30. For example, the cooling passages 50 and the dampening cavities 30 may be provided only on one or more sections where the dampening of thermo-acoustic vibrations and/or the cooling requirements are particularly strong.

Figure 7:
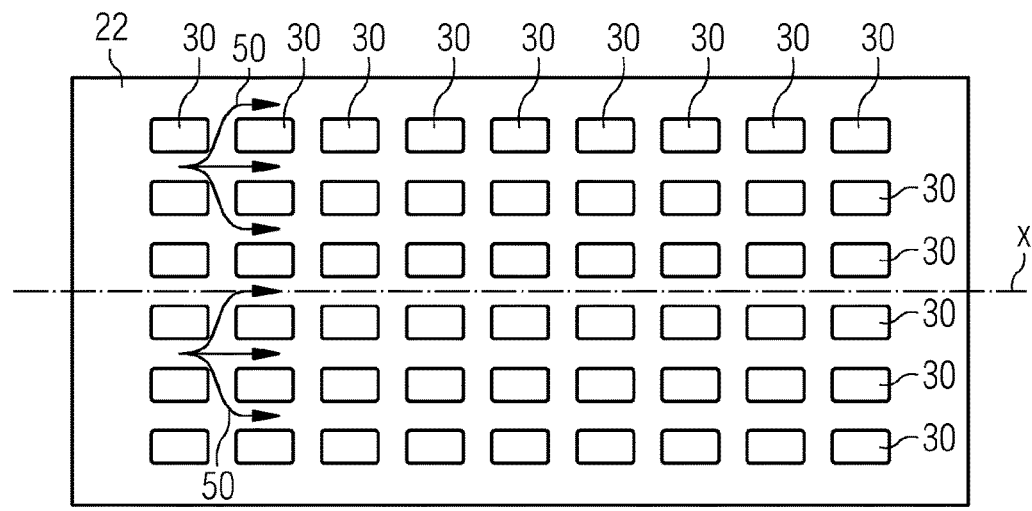
Figure 8:
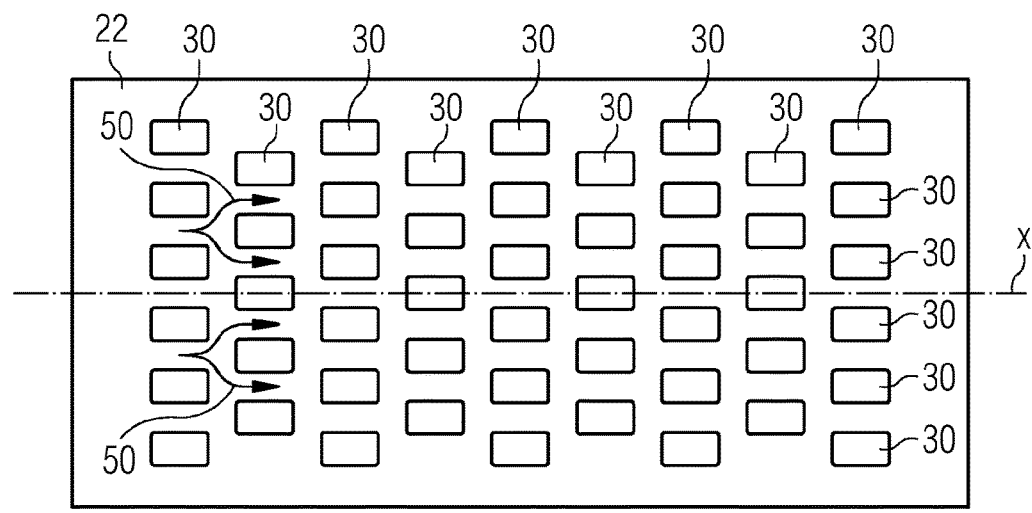
Figure 9:
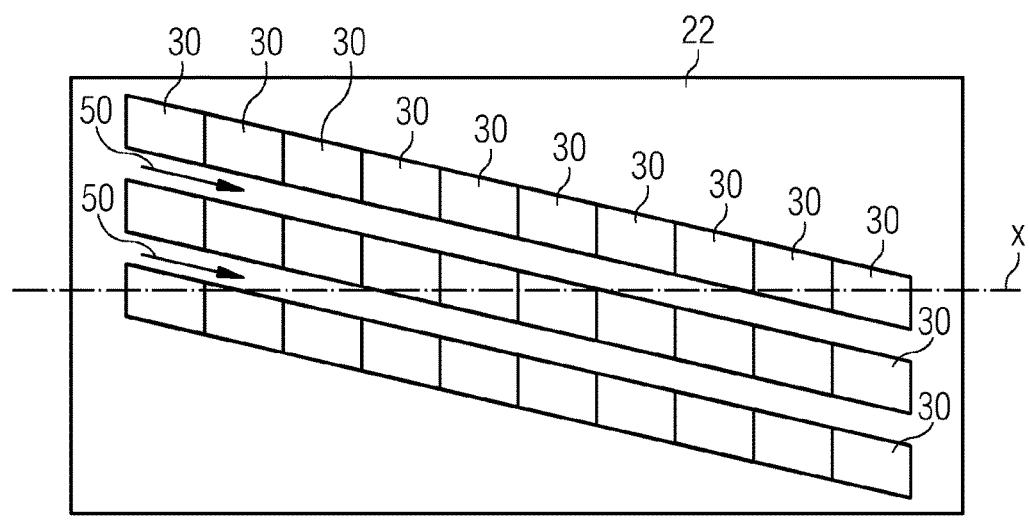

In particular with reference to three possible embodiments of the present invention, FIGS. 7, 8 and 9 respectively show three different geometrical arrangement patterns of dampening cavities 30 and of cooling passages 50 over the inner wall 22. Each of the dampening cavities 30 in FIGS. 7, 8 and 9 may be analogous to any of the damping cavities in FIGS. 3 to 6. In FIG. 7 dampening cavities 30 are distributed according to a matrix pattern including a plurality of rows and columns, respectively parallel and orthogonal to the longitudinal direction X. Each dampening cavity 30 is spaced from the others in both the directions, parallel and orthogonal to the longitudinal direction X. In FIG. 8 dampening cavities 30 are staggered. In both embodiment of FIGS. 7 and 8, cooling passages 50 surround each dampening cavity 30 as described with reference to the embodiment in FIG. 6. In FIG. 9 rows of dampening cavities 30 are used, similarly to the embodiment in FIGS. 3 to 5, but with the difference that rows in FIG. 9 are not parallel to the longitudinal direction X. The cooling passages 50 between the rows of dampening cavities 30 are consequently not parallel to the longitudinal direction X, too.

A great variety of different other geometries may be achieved, for example, by using additive manufacturing, instead of welding.

Particularly the side cavity wall 42 and/or 43 and/or the third side cavity walls 44 and/or the walls of the plurality of cooling passages 50 may be built by additive manufacturing techniques, for example by selective laser melting, selective laser sintering, electron-beam melting, selective heat sintering, or electron beam freeform fabrication. Particularly the solutions using lasers (e.g. selective laser melting, selective laser sintering) allow very fine structures and fine geometries.

By using additive manufacturing techniques, the optimal (complex) acoustic geometry can be established and also allow separation of each dampening hole on the cold side, making it possible to utilize less cooling air since each cavity only has one hole. Only a small purging flow is necessary in each cavity. The convective cooling of the wall is maintained in a separate channel in between the dampening cavities where only a small amount of air is bled off. By maintaining the main cooling stream straight and the bleeds in a negative angle, a dust trap can be arranged for these very small holes. The main channel can also be convergent if necessary to maintain convective heat transfer along the dampening segment of the combustion chamber wall. The dampening segment can be matched thermally with other parts of the combustion chamber to maintain mechanical integrity.

For all the geometry, it is essential that the cooling passages 50 are decoupled from the dampening cavities 30, in such a way that the convective cooling medium mainly flows in channels separated from the dampening cavities. The convective cooling relies primarily on the main flow of the cooling medium inside the passages 50, i.e. outside the dampening cavities 30, even if a small flow of cooling medium through the purging holes 60 and the dampening holes 40 is allowed for purging reasons.

In the sections of the combustion chamber 10 where the cooling passages 50 and the dampening cavities 30 are provided, the flow of the cooling medium is mainly longitudinal, inside the cooling passages 50, while a minor portion of the cooling medium enters the dampening cavities 30 through the purging holes 60 and the inner volume V through the dampening holes 40.

It is advantageous that the dampening cavities additionally act to provide cooling air to cool the inner wall 22, which is typically affected by the hot combustion zone.

The dampening cavities 30 may particularly be located close to heat release with the combustion volume, i.e. near the flame front. It may be located in a front panel or combustion liner. It may also or additionally be located close to where eigenmode largest fluctuation is present.

It may also be possible that the complete wall surrounding the combustion volume is equipped with a plurality of dampening cavities.

In the region where the dampening cavities are present, they may be arranged as a full ring provided with dampening cavities.

Particularly when using additive manufacturing, ring segments may be produced in which all walls are produced by an additive manufacturing process. The ring segments then will be attached to one closed ring, e.g. by welding. A smaller combustion chamber may be built as a full ring—a cylindrical component—without segmentation.

The shape of the "helmholtz volume" can be arbitrary, e.g. globe, conical, rectangular, honeycomb, etc. The shape of the holes may be round or oval, etc.

The dampening cavities—i.e. the "Helmholtz volume" can have different spacing in between. The different dampening cavities can be placed together or with a distance inbetween both tangential or axial direction.

It may be advantageous to have at least 1000 dampening cavities present in one combustion chamber.

Furthermore embodiments can be implemented without specific cooling passages 50 (as proposed in FIG. 5) but to simply have a plurality of dampening cavities that are each distant to another and the cooling air flows between the distinct dampening cavities.

The invention claimed is:

1. A combustion chamber for a gas turbine engine comprising:
a double-walled combustion chamber comprising an inner wall delimiting an inner volume of the combustion chamber, through which combustion gas flows from a burner to a gas turbine of the gas turbine engine, an outer wall, and an interspace between the inner wall and the outer wall, a plurality of dampening cavities disposed in the interspace and configured to dampen thermo-acoustic vibrations in the combustion gas, each dampening cavity of the plurality of dampening cavities communicating with the inner volume through at least one dampening hole through the inner wall, and each dampening cavity bounded on an inner side by the inner wall, bounded on an outer side by the outer wall, and bounded laterally by at least one side cavity wall that contacts the inner wall and the outer wall, and at least one cooling passage configured to convey a cooling medium in the interspace and in thermal contact with the inner wall, each dampening cavity comprising at least one purging hole communicating with the at least one cooling passage and configured to purge a portion of the cooling medium flowing in the at least one cooling passage through a respective dampening cavity to the inner volume.

2. The combustion chamber according to claim 1, the at least one purging hole being provided through the at least one side cavity wall.

3. The combustion chamber according to claim 2, wherein the at least one side cavity wall and/or the inner wall of the at least one cooling passage is built via an additive manufacturing process.

4. The combustion chamber according to claim 1, wherein the interspace annularly extends around the inner volume of the combustion chamber.

5. The combustion chamber according to claim 1, wherein at least a portion of the plurality of dampening cavities are arranged along at least one row.

6. The combustion chamber according to claim 5, wherein the plurality of dampening cavities are arranged along a plurality of rows extending along a longitudinal direction parallel to a main flow direction of the combustion gas inside the inner volume.

7. The combustion chamber according to claim 6, wherein the at least one cooling passage is provided between at least a couple of said plurality of rows of dampening cavities.

8. The combustion chamber according to claim 7, wherein the at least one purging hole is inclined at an acute angle relative to a direction of flow of the cooling medium flowing in the at least one cooling passage, and the at least one purging hole comprise an outlet disposed upstream of a respective inlet relative to the direction of flow of the cooling medium.

9. The combustion chamber according to claim 5, wherein the plurality of dampening cavities are arranged along a plurality of rows extending along a longitudinal direction which is not parallel to a main flowing direction of the combustion gas inside the inner volume.

10. The combustion chamber according to claim 1, wherein the at least one cooling passage comprises a section narrowing along a main flow direction of cooling medium inside the at least one cooling passage.

11. The combustion chamber according to claim 1, wherein the at least one side cavity wall comprises two side cavity walls in thermal contact with the cooling medium.

12. The combustion chamber according to claim 1, wherein the plurality of dampening cavities are arranged according to a matrix pattern including a plurality of rows and columns.

13. The combustion chamber according to claim 1, wherein the plurality of dampening cavities are staggered.

14. A gas turbine engine comprising:
a burner,
a gas turbine, and
a combustion chamber according to claim 1, between the burner and the gas turbine.

15. An apparatus, comprising:
a double-walled combustion chamber of a gas turbine, comprising:
an inner wall that defines an inner volume of the double-walled combustion chamber;
an outer wall, and an interspace between the inner wall and the outer wall;
a cooling passage configured to convey a cooling medium in the interspace; and a plurality of dampening structures, each dampening structure of the plurality of dampening structures comprising:
a dampening cavity comprising a perimeter that is directly defined by the inner wall, by the outer wall, and by at least one side wall that reaches both the inner wall and the outer wall; a dampening hole through the inner wall that provides fluid communication between the dampening cavity and the inner volume; and a purging hole through the side boundary that provides fluid communication between the dampening cavity and the cooling passage.

* * * * *